US012671040B2

(12) United States Patent
Shin et al.

(10) Patent No.: US 12,671,040 B2
(45) Date of Patent: Jun. 30, 2026

(54) TANTALUM CAPACITOR INCLUDING NICKEL

(71) Applicant: SAMSUNG ELECTRO-MECHANICS CO., LTD., Suwon-si (KR)

(72) Inventors: Hyunho Shin, Suwon-si (KR); Youngjune Lee, Suwon-si (KR); Wansuk Yang, Suwon-si (KR); Eun Ji Kong, Suwon-si (KR); Ji Han Seo, Suwon-si (KR); Hyunsub Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 94 days.

(21) Appl. No.: 18/588,923

(22) Filed: Feb. 27, 2024

(65) Prior Publication Data

US 2024/0379297 A1     Nov. 14, 2024

(30) Foreign Application Priority Data

May 8, 2023     (KR) ........................ 10-2023-0059442

(51) Int. Cl.
*H01G 9/012*          (2006.01)
*H01G 9/008*          (2006.01)
(Continued)
(52) U.S. Cl.
CPC ............. *H01G 9/042* (2013.01); *H01G 9/008* (2013.01); *H01G 9/012* (2013.01); *H01G 9/025* (2013.01);
(Continued)

(58) Field of Classification Search
CPC ...... H01G 9/0525; H01G 9/025; H01G 9/008; H01G 9/042; H01G 9/012; H01G 9/15
See application file for complete search history.

(56) References Cited

U.S. PATENT DOCUMENTS 4,430,690 A *   2/1984   Chance .................... H01G 4/30
                                                              29/25.42
6,346,127 B1 *  2/2002   Kuriyama .............. H01G 2/065
                                                              29/25.03
(Continued)

FOREIGN PATENT DOCUMENTS

CN          11285707 A       1/2021
JP          H09266136 A  *  10/1997   ............. H01G 9/012
(Continued)

*Primary Examiner* — David M Sinclair
(74) *Attorney, Agent, or Firm* — Morgan, Lewis & Bockius LLP

(57)          ABSTRACT

A tantalum capacitor including a capacitor body including a tantalum body including a tantalum wire exposed on one side and a capsule portion configured to surround the tantalum body so that an end of the tantalum wire is exposed; a first metal layer on one side of the capacitor body and a second metal layer on one side of the first metal layer; and an external electrode connected to the first metal layer, wherein the first metal layer includes Cr (chromium), Ti (titanium), an alloy thereof, or a mixture thereof, and the second metal layer includes Ni (nickel), an alloy including the same, or a mixture including the same.

15 Claims, 7 Drawing Sheets

(51) Int. Cl.
*H01G 9/025* (2006.01)
*H01G 9/042* (2006.01)
*H01G 9/052* (2006.01)
*H01G 9/15* (2006.01)
*H01G 9/04* (2006.01)

(52) U.S. Cl.
CPC ............. *H01G 9/0525* (2013.01); *H01G 9/15* (2013.01); *H01G 2009/05* (2013.01)

(56) References Cited

U.S. PATENT DOCUMENTS

| | | | | |
|---|---|---|---|---|
| 2003/0111247 A1* | 6/2003 | Araki | ..................... | H01G 11/56 |
| | | | | 174/520 |
| 2006/0262489 A1* | 11/2006 | Vaisman | .................. | H01G 9/15 |
| | | | | 361/540 |

| | | | | |
|---|---|---|---|---|
| 2008/0285209 A1* | 11/2008 | Horio | ...................... | H01G 9/012 |
| | | | | 361/523 |
| 2011/0122545 A1* | 5/2011 | Yoshimitsu | ............ | H01G 9/151 |
| | | | | 361/523 |
| 2016/0071654 A1* | 3/2016 | Kimura | .................... | H01G 9/14 |
| | | | | 156/60 |
| 2016/0133391 A1* | 5/2016 | Navratil | .................. | H01G 9/26 |
| | | | | 29/25.03 |
| 2017/0236647 A1* | 8/2017 | Intelmann | ............ | H01G 9/0036 |
| | | | | 427/80 |
| 2020/0320831 A1* | 10/2020 | Cohen | ................. | G07F 17/3288 |
| 2024/0087817 A1* | 3/2024 | Sato | ......................... | H01G 4/30 |

FOREIGN PATENT DOCUMENTS

| | | |
|---|---|---|
| JP | 2018-110201 A | 7/2018 |
| KR | 10-2005-0010633 A | 1/2005 |

* cited by examiner

I - I'

TANTALUM CAPACITOR INCLUDING NICKEL

CROSS-REFERENCE TO RELATED APPLICATION

This application claims priority to and the benefit of Korean Patent Application No. 10-2023-0059442 filed in the Korean Intellectual Property Office on May 8, 2023, the entire contents of which are incorporated herein by reference.

BACKGROUND

(a) Technical Field

The present disclosure relates to tantalum capacitors.

(b) Description of the Related Art

Tantalum capacitors are electronic components used in passive component-intensive products such as TV, mobile devices, laptop computers, tablet PCs, automotive electronic components, etc.

A tantalum (Ta) material is a metal widely used throughout industries such as electrical, electronic, mechanical, chemical, space, and military fields due to mechanical or physical properties such as a high melting point, excellent ductility and corrosion resistance, and the like. Such a tantalum material features to form a stable anodic oxide film and thus is widely used as an anode material of a small capacitor, whose usage is rapidly increasing every year due to rapid development of IT industries such as electronics and information communication in recent times.

In recent years, as the demand of small tantalum capacitors capable of realizing high capacitance tend to be increasing, which requires of making a size of a tantalum body as large as possible.

For this reason, a so-called frameless tantalum capacitor, in which a bottom electrode used as a terminal is connected to the tantalum body and a tantalum wire without using a separate connection frame, is used.

When the frameless tantalum capacitor is thinned, since a tantalum device thereinside is relatively larger, while a capsule portion protecting the tantalum device and applying moisture resistance to the capacitor is thinned, there is a problem of deteriorating moisture resistance reliability of the capacitor.

In addition, a high-voltage (10 V or more) tantalum capacitor, in which a conductive polymer including acid corroding a metal is used, has a problem that the acid may react with moisture under high temperature and high humidity conditions and accelerate the corrosion of internal metals.

Specifically, the frameless tantalum capacitor is sputtered and plated on both sides, in order to electrically connect the bottom electrode to an anode and a cathode, wherein copper (Cu) is in general used. The copper has advantages of low equivalent series resistance (ESR) due to excellent electrical conductivity and a relatively low raw material cost. However, when an electric field is applied to the copper under an acidic atmosphere, electro-migration occurs, making $Cu^{2+}$ ions move from the anode to the cathode and increasing a leakage current, which may be developed into a destruction mode called to be a short circuit (short).

Accordingly, the moisture resistance reliability of the capacitor may not only be necessary to improve, but also a metal layer having low reactivity with the acid is necessary to introduce to improve electrical characteristics of the capacitor.

SUMMARY

An aspect of the embodiment provides a tantalum capacitor having high moisture resistance reliability and improved electrical characteristics.

However, problems to be solved by the embodiments are not limited to the above-described problems and may be variously expanded within the range of technical ideas included in the embodiments.

A tantalum capacitor according to an embodiment includes a capacitor body including (i) a tantalum body including a tantalum wire extending toward a surface of the capacitor body and (ii) a capsule portion surrounding the tantalum body such that the capsule portion does not cover an end of the tantalum wire; a first metal layer on one side of the capacitor body; a second metal layer on one side of the first metal layer; and an external electrode connected to the first metal layer, wherein the first metal layer includes Cr (chromium), Ti (titanium), an alloy thereof, or a mixture thereof, and the second metal layer includes Ni (nickel), an alloy including the same, or a mixture including the same.

The tantalum capacitor may further include (i) a third metal layer on the surface of the capacitor body and facing the first metal layer in a first direction; and (ii) a fourth metal layer on one surface of the third metal layer. The capacitor body may include first and second surfaces facing each other in a second direction perpendicular to the first direction, third and fourth surfaces facing each other in the first direction, and fifth and sixth surfaces facing each other in a third direction perpendicular to the first and second directions, wherein the third metal layer may include Cr (chromium), Ti (titanium), an alloy thereof, or a mixture thereof, and the fourth metal layer may include Ni (nickel), an alloy including the same, or a mixture including the same.

The external electrode may include first and second external electrodes spaced apart from each other and disposed on the second surface of the capacitor body.

An average thickness of the first metal layer may be smaller than an average thickness of the second metal layer.

An average thickness of the first metal layer may be about 20 nm to about 100 nm, and an average thickness of the second metal layer may be about 50 nm to about 500 nm.

An average thickness of the third metal layer may be about 20 nm to about 100 nm, and an average thickness of the fourth metal layer may be about 50 nm to about 500 nm.

The tantalum capacitor may further include a solid electrolyte layer disposed on a surface of the tantalum body and including para toluenesulfonic acid (P-TSA).

The first external electrode may be connected to the tantalum body, and the second external electrode may be connected to the tantalum wire.

The tantalum capacitor may further include a base layer between the capsule portion and the external electrode.

The tantalum capacitor may further include a connection electrode between the base layer and the tantalum body.

A tantalum capacitor according to another embodiment includes a capacitor body including (i) a tantalum body including a tantalum wire extending toward a surface of the capacitor body and (ii) a capsule portion surrounding the tantalum body such that the capsule portion does not cover an end of the tantalum wire; a first metal layer on a first side of the capacitor body; a second metal layer on one side of the first metal layer; a third metal layer on a second side of the capacitor body; a fourth metal layer on one side of the third metal layer; and an external electrode connected to the first metal layer and the third metal layer, wherein the first and third metal layers include Cr (chromium), Ti (titanium), an alloy thereof, or a mixture thereof, and the second and fourth metal layers include Ni (nickel), an alloy including the same, or a mixture including the same.

The capacitor body may include first and second surfaces facing each other in a second direction, third and fourth surfaces facing each other in a first direction perpendicular to the second direction, and fifth and sixth surfaces facing each other in a third direction perpendicular to the first and second directions, and the external electrode may include first and second external electrodes spaced apart from each other and disposed on the second surface of the capacitor body.

An average thickness of each of the first and third metal layers may be smaller than an average thickness of each of the second and fourth metal layers.

An average thickness of each of the first metal layer and the third metal layer may be about 20 nm to about 100 nm, and an average thickness of each of the second metal layer and the fourth metal layer may be about 50 nm to about 500 nm.

The tantalum capacitor may further include a solid electrolyte layer disposed on a surface of the tantalum body and including para-toluenesulfonic acid (P-TSA).

The first external electrode may be connected to the tantalum body, and the second external electrode may be connected to the tantalum wire.

The tantalum capacitor may further include a base layer between the capsule portion and the external electrode.

The tantalum capacitor may further include a connection electrode between the base layer and the tantalum body.

The tantalum capacitor may be a frameless tantalum capacitor.

The first and third metal layers may include Cr (chromium) or Ti (titanium).

The second and fourth metal layers include Ni (nickel) or an alloy including Ni (nickel) and Cr (chromium).

The tantalum capacitor according to the embodiment may have improved electrical characteristics while having high moisture resistance reliability.

However, the various advantageous advantages and effects of the present disclosure are not limited to the above descriptions, and will be more easily understood in the process of describing specific embodiments of the present disclosure.

DETAILED DESCRIPTION

Figure 1:
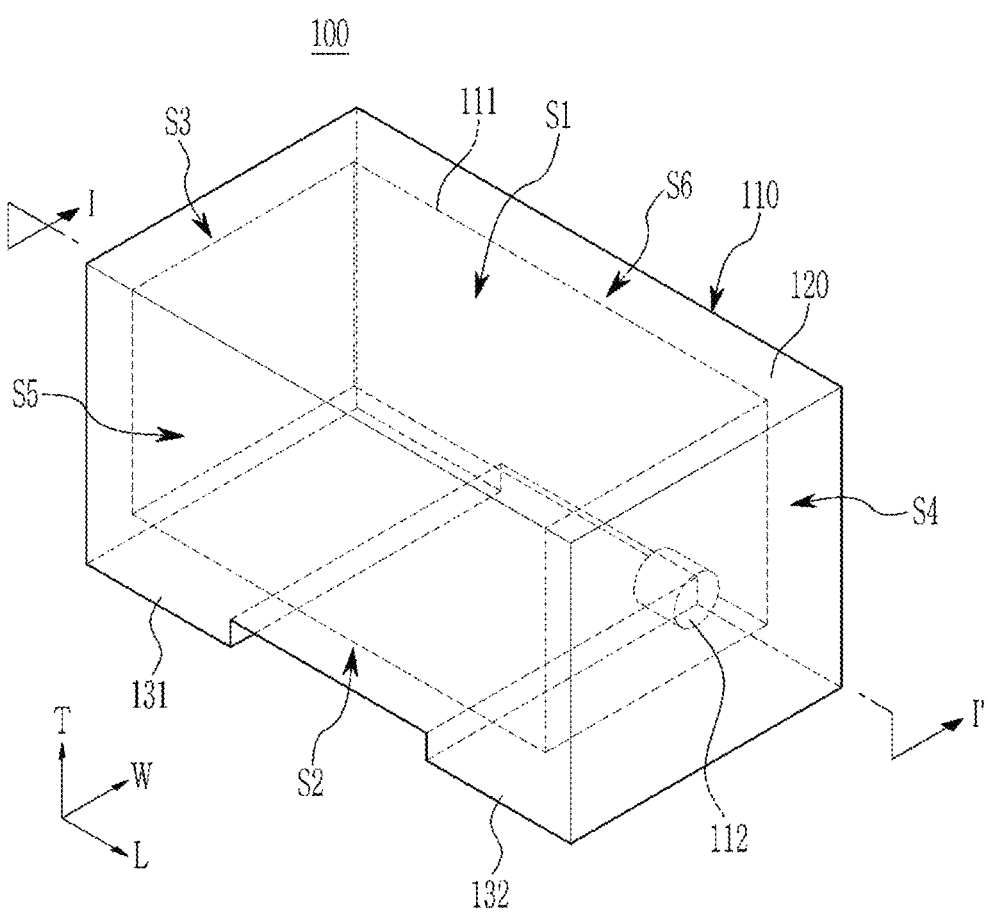
FIG. 1 is a perspective view schematically illustrating a tantalum capacitor according to an embodiment.

Hereinafter, various embodiments of the present disclosure will be described in detail with reference to the accompanying drawings so that those skilled in the art may easily carry out the present disclosure. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present invention.

Terms including ordinal numerals such as "first", "second", and the like may be used to describe various constituent elements, but the constituent elements are not limited by these terms. These terms are used only to distinguish one constituent element from another constituent element.

When one constituent element is described as being "connected" or "linked" to another constituent element, it should be understood that one constituent element can be connected or linked directly to another constituent element or opposed to another constituent element, and an intervening constituent element can also be present between the constituent elements. On the other hand, when it is mentioned that a certain element is "directly connected" or "directly linked" to another element, it should be understood that other elements do not exist therebetween.

In the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Therefore, unless explicitly described to the contrary, the word "comprise" and variations such as "comprises" or "comprising", will be understood to imply the inclusion of stated elements but not the exclusion of any other elements.

Figure 2:
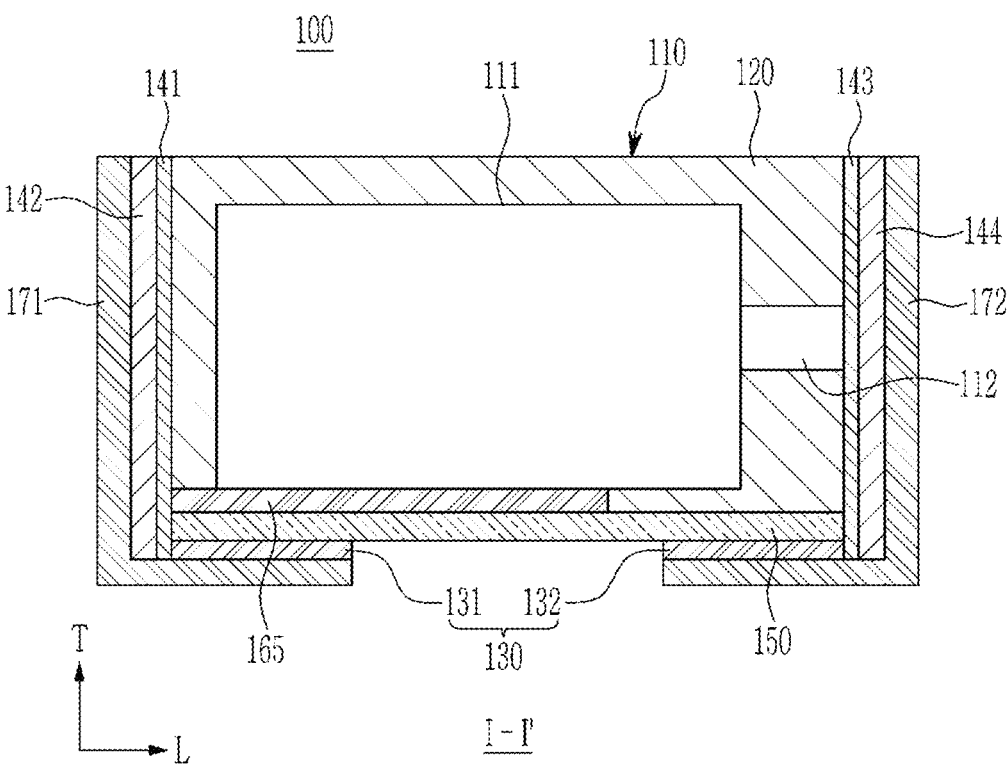
FIG. 2 is a cross-sectional view of the tantalum capacitor taken along line I-I' of FIG. 1.
Figure 3:
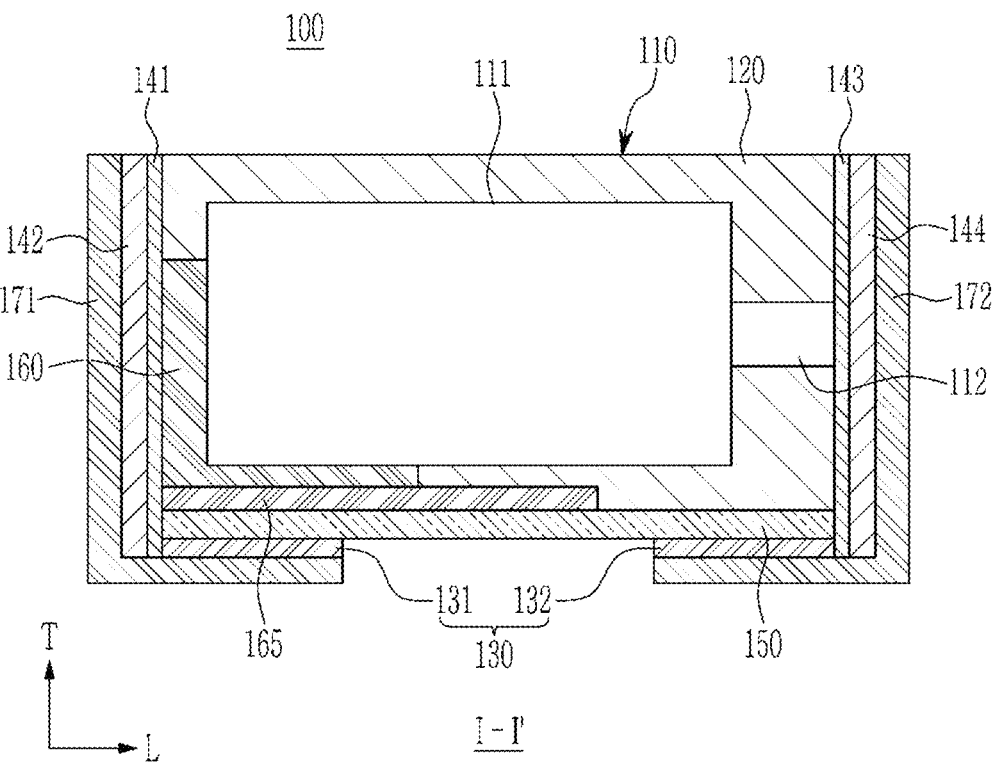
FIG. 3 is a cross-sectional view of a tantalum capacitor according to another embodiment taken along the line I-I' of FIG. 1.

FIG. 1 is a perspective view schematically illustrating a tantalum capacitor according to an embodiment and FIGS. 2 and 3 are cross-sectional views of the tantalum capacitor taken along line I-I' of FIG. 1.

When directions are defined to clearly describe the present embodiment, the L-axis, W-axis, and T-axis indicated in the drawings represent the longitudinal direction, the width direction, and the thickness direction of the tantalum capacitor 100 and the capacitor body 110, respectively.

Also, the T-axis direction shown in the drawing may indicate a second direction, the L-axis direction may indicate a first direction, and the W-axis direction may indicate a third direction.

The longitudinal direction (L-axis direction) means a direction substantially perpendicular to the thickness direction (T-axis direction), and the width direction (W-axis direction) may be defined as a direction substantially perpendicular to the thickness direction (T-axis direction) and substantially perpendicular to the longitudinal direction (L-axis direction). Also, the longitudinal direction (L-axis direction) may indicate a direction that is longer than the width direction (W-axis direction) among directions substantially perpendicular to the thickness direction (T-axis direction).

In addition, the direction in which the tantalum wire is exposed in the tantalum body is set to a front side, and the direction facing the front side is set to a rear side. Both surfaces facing the tantalum body in the longitudinal direction will be described as both side surfaces, and both surfaces facing the tantalum body in the thickness direction will be set as upper and lower surfaces.

In addition, both surfaces opposing each other in the T-axis direction (second direction) of the capacitor body are defined as a first surface S1 and a second surface S2, both surfaces connecting the first and second surfaces and facing each other in the L-axis direction (first direction) are defined as a third surface S3 and a fourth surface S4, and both surfaces connecting the first and second surfaces and connected to the third and fourth surfaces, and opposed to each other in the W-axis direction (third direction) are defined as the fifth surface S5 and the sixth surface S6.

Referring to FIGS. 1 and 2, a tantalum capacitor 100 according to an embodiment includes a capacitor body 110 including a tantalum body 111 including a tantalum wire 112 exposed on one side and a capsule portion 120 configured to surround the tantalum body 111 so that an end of the tantalum wire 112 is exposed; a first metal layer 141 on one side of the capacitor body 110 and a second metal layer 142 on one side of the first metal layer 141; and an external electrode 130 connected to the first metal layer 141, wherein the first metal layer 141 includes Cr (chromium), Ti (titanium), an alloy thereof, or a mixture thereof and the second metal layer 142 includes Ni (nickel), an alloy including the same, or a mixture including the same.

A tantalum capacitor 100 according to another embodiment includes a capacitor body 110 including a tantalum body 111 including a tantalum wire 112 exposed on one side and a capsule portion 120 configured to surround the tantalum body 111 so that an end of the tantalum wire 112 is exposed; a first metal layer 141 on one side of the capacitor body 110 and a second metal layer 142 on one side of the first metal layer 141; a third metal layer 143 on the other side of the capacitor body 110 and a fourth metal layer 144 on one side of the third metal layer 143; and an external electrode 130 connected to the first metal layer 141 and the third metal layer 143, wherein the first and third metal layers 141 and 143 include Cr (chromium), Ti (titanium), an alloy thereof or a mixture thereof and the second and fourth metal layers 142 and 144 include Ni (nickel), an alloy including the same, or a mixture including the same.

A tantalum capacitor according to an embodiment is capable of improving electrical characteristics by reducing an increase in leakage current in a high-temperature, high-humidity environment while having high moisture resistance reliability.

Hereinafter, each component included in the tantalum capacitor 100 will be described in detail.

The tantalum capacitor 100 according to an embodiment includes a capacitor body 110, wherein the capacitor body 110 includes a tantalum body 111 including a tantalum wire 112 exposed to one side and a capsule portion 120 configured to surround the tantalum body 111 so that an end of the tantalum wire 112 is exposed.

For example, the tantalum wire 112 may be exposed as the fourth surface S4 of the capacitor body 110.

The tantalum body 111 may have a pellet, sponge, sheet, foil, or mesh shape, but is not limited thereto.

The tantalum body 111 may be formed of a tantalum metal or a tantalum powder.

The tantalum powder may be prepared by reacting potassium fluorotantalate ($K_2TaF_7$), sodium fluorotantalate ($Na_2TaF_7$), or tantalum pentachloride ($TaCl_5$), which are types of tantalum salts, with a reducing agent. As an example, the tantalum body 111 may be manufactured by mixing and stirring tantalum powder and a binder at a predetermined ratio, compressing the mixed powder, forming it into a rectangular parallelepiped, and then sintering it under high temperature and high vacuum.

A dielectric layer (not shown) may be disposed on the surface of the tantalum body 111. The dielectric layer may be formed through anodization of a tantalum capacitor.

For example, the dielectric layer may include an oxide of tantalum metal, such as tantalum pentoxide ($Ta_2O_5$).

For example, the tantalum capacitor 100 may further include a solid electrolyte layer (not shown) on the surface of the tantalum body 111. For example, the solid electrolyte layer may be on the surface of the dielectric layer by immersing the tantalum body 111 on which the dielectric layer is disposed in a polymerization solution and performing reaction in a polymerization furnace. The solid electrolyte layer may constitute a cathode of a tantalum capacitor. Accordingly, the tantalum body 111 including the solid electrolyte layer on its surface may constitute a cathode of a tantalum capacitor.

The solid electrolyte layer may include a conductive polymer, manganese dioxide ($MnO_2$), or a combination thereof.

When the solid electrolyte layer includes a conductive polymer, it may be formed on the surface of the dielectric layer by chemical polymerization or electrolytic polymerization. The conductive polymer material is not particularly limited as long as it is a polymer material having conductivity, and may include, for example, polypyrrole, polythiophene, polyacetylene, and/or polyaniline.

When the solid electrolyte layer includes manganese dioxide ($MnO_2$), conductive manganese dioxide may be formed on the surface of the dielectric layer by immersing the tantalum body 111 in a manganese aqueous solution such as manganese dioxide and then heating the manganese aqueous solution.

For example, the solid electrolyte layer may include an acid such as P-TSA (para-toluenesulfonic acid).

Conventionally, there has been a problem in that the solid electrolyte layer having such an acid component accelerated corrosion of the internal metal by combining with moisture under a load condition of high temperature and high humidity. However, the tantalum capacitor according to an embodiment includes a metal layer containing Ni (nickel), and since the alloy containing Ni (nickel) has low reactivity with P-TSA, electrical characteristics of the device may be improved.

A cathode reinforcing layer (not shown) may be additionally on the surface of the solid electrolyte layer of the tantalum body 111 if necessary. The cathode reinforcing layer may include a stack of a carbon layer and a silver (Ag) layer. The carbon layer is for reducing the contact resistance of the surface of the tantalum body, and the silver (Ag) layer is a material having high electrical conductivity and is generally used to form a conductive layer in the art, but is not necessarily limited thereto.

In addition, the tantalum body 111 has a tantalum wire 112 exposed to one side (fourth surface) of the front side. The tantalum wire 112 may constitute an anode of a tantalum capacitor.

The tantalum wire 112 may be inserted and mounted into a mixture of the tantalum powder and the binder so as to be eccentric from the center before compressing the mixed powder of the tantalum powder and the binder.

In other words, the tantalum body 111 may be manufactured by inserting and mounting the tantalum wire 112 into the mixture of the tantalum powder and the binder to form a tantalum device with a desired size and then, sintering the tantalum device at a high temperature under a high vacuum atmosphere.

The capsule portion 120 may serve to protect the tantalum wire 112 and the tantalum body 111 from the outside.

The capsule portion 120 surrounds the tantalum body 111 to expose the tantalum wire 112 through the fourth surface, which one side of the capacitor body.

This capsule portion 120 may include a photocurable epoxy resin surrounding the tantalum body 111. For example, the capsule portion 120 may be formed by transfer-molding a resin such as an epoxy molding compound (EMC) and the like.

The external electrode 130 is connected to the first metal layer 141 or the third metal layer 143 described later. For example, the external electrode 130 may be electrically connected to a second metal layer or a fourth metal layer described later through the first or third metal layer.

The external electrode 130 may include the first and second external electrodes 131 and 132 disposed with a space apart from each other on one surface of the capacitor body.

For example, the first and second external electrodes 131 and 132 are disposed with a space apart from each other in the L-axis direction on the second surface S2 of the capacitor body 110, which is a bottom structure. However, the present embodiment is not limited thereto, but the first and second external electrodes 131 and 132 may be respectively disposed on the third surface S3 and the fourth surface S4, which are both sides of the capacitor body 110 facing each other in the L-axis direction.

The first and second external electrodes 131 and 132 may be made of a conductive metal.

The first external electrode 131 is disposed to be exposed to the bottom surface of the capsule portion 120 and electrically connected to the tantalum body 111 constituting the cathode through the first metal layer 141.

The second external electrode 132 may be disposed with a space apart from the first external electrode 131 in the L-axis direction, the longitudinal direction of the tantalum body 111, to be exposed to the bottom surface of the capsule portion 120 and thus electrically connected to the tantalum wire 112 constituting the anode through the third metal layer 143.

The first and second external electrodes 131 and 132 may be disposed as a monolayer or a plurality of layers of two more layers.

The tantalum capacitor 100 according to an embodiment includes the first metal layer 141 disposed on one surface of the capacitor body 110 and the second metal layer 142 disposed on one surface of the first metal layer 141. For example, the tantalum capacitor 100 may further include the third metal layer 143 disposed on one surface facing the first metal layer 141 in the first direction and the fourth metal layer 144 disposed on one surface of the third metal layer 143.

A tantalum capacitor 100 according to another embodiment includes a first metal layer 141 on one side of the capacitor body 110 and a second metal layer 142 on one side of the first metal layer 141; and a third metal layer 143 on the other side of the capacitor body 110 and a fourth metal layer 144 on one side of the third metal layer 143.

For example, the capacitor body 110 may include first and second surfaces facing each other in a second direction perpendicular to the first direction, third and fourth surfaces facing in the first direction, and fifth and sixth surfaces facing in a third direction perpendicular to the first and second directions, and a first metal layer 141 and a third metal layer 143 may be disposed on third and fourth surfaces of the capacitor body 110 facing each other in the first direction (L-axis direction).

Referring to FIGS. 2 and 3, the first metal layer 141 may be disposed on the third surface S3 of the capacitor body 110 to electrically connect the tantalum body 111 with the first external electrode 131 through the first metal layer 141.

In addition, the third metal layer 143 may be disposed on the fourth surface S4 of the capacitor body 110 to electrically connect the tantalum wire 112 with the second external electrode 132 through the fourth surface S4 of the capacitor body 110.

For example, referring to FIGS. 2 and 3, the first metal layer 141 and the third metal layer 143 may be disposed to contact with the capsule portion 120, a base layer 150, and first and second external electrodes 131 and 132.

Referring to FIGS. 2 and 3, the second metal layer 142 is disposed on one surface of the first metal layer 141, and the fourth metal layer 144 is disposed on one surface of the third metal layer.

The first to fourth metal layers 141, 142, 143, and 144 may be formed by a sputtering method to connect a tantalum device (tantalum body, tantalum wire) and the external electrodes with a thin thickness but still secure high density but low resistance.

The first to fourth metal layers 141, 142, 143, and 144 may include nickel (Ni), tin (Sn), chromium (Cr), titanium (Ti), palladium (Pd), iron (Fe), Ni (nickel), an alloy thereof, or a mixture thereof.

For example, the first metal layer 141 and the third metal layer 143 include Cr (chromium), Ti (titanium), an alloy thereof, or a mixture thereof.

For example, the second or fourth metal layers 142 and 144 include Ni (nickel), an alloy including the same, or a mixture including the same.

When a Ni (nickel)-containing metal is used instead of conventionally used Cu (copper), even if an electric field is applied thereto under an acidic atmosphere, since oxidized in a form of corrosion without electro-migration, after the oxidation reaction sufficiently proceeds, open defects rather than short circuits (short) may occur, resultantly achieving excellent moisture resistance reliability, compared with the conventional art.

In an embodiment, the first metal layer 141 or the third metal layer 143 has a thinner average thickness than the second metal layer 142 or the fourth metal layer 144.

In an embodiment, the average thickness of the first metal layer 141 or third metal layer 143 may be 20 nm to 100 nm. When the average thickness of the first metal layer 141 or the third metal layer 143 is less than 20 nm, the corrosion may rapidly proceed under high temperature and high humidity conditions, but when the average thickness is greater than 100 nm, interface adhesion may be deteriorated.

In an embodiment, the average thickness of the second metal layer 142 or fourth metal layer 144 may be 50 nm to 500 nm.

When the second metal layer 142 or the fourth metal layer 144 has an average thickness of less than 50 nm, there may be a problem that the corrosion rapidly proceeds under the high temperature and high humidity conditions, but when the average thickness is greater than 500 nm, the interface adhesion may be deteriorated, so that the capacitor may be deformed by a strong magnetic field applied in the sputter layer.

In an embodiment, a ratio of the average thickness of the first or third metal layer 141 and 143: that of the second or fourth metal layer 142 and 144 may be 1:2 to 1:25.

When the average thickness ratio is satisfied, a capacitor having a metal layer with excellent interface adhesion and excellent moisture resistance reliability under high temperature and high humidity conditions may be realized.

Figure 4:
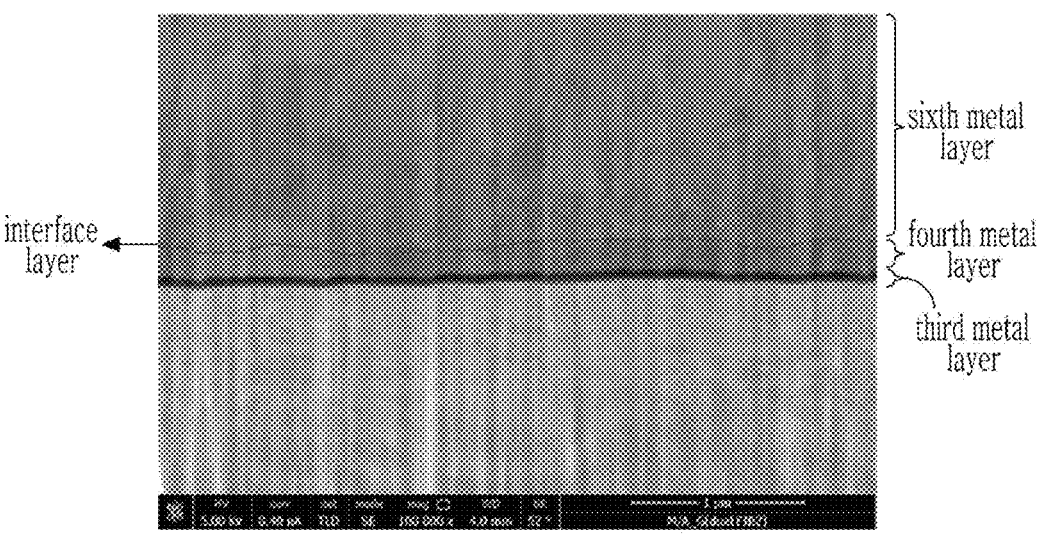
FIG. 4 shows an image of a result of FIB analysis on the central portion of the fourth surface S4 of the tantalum capacitor according to an embodiment.
Figure 5:
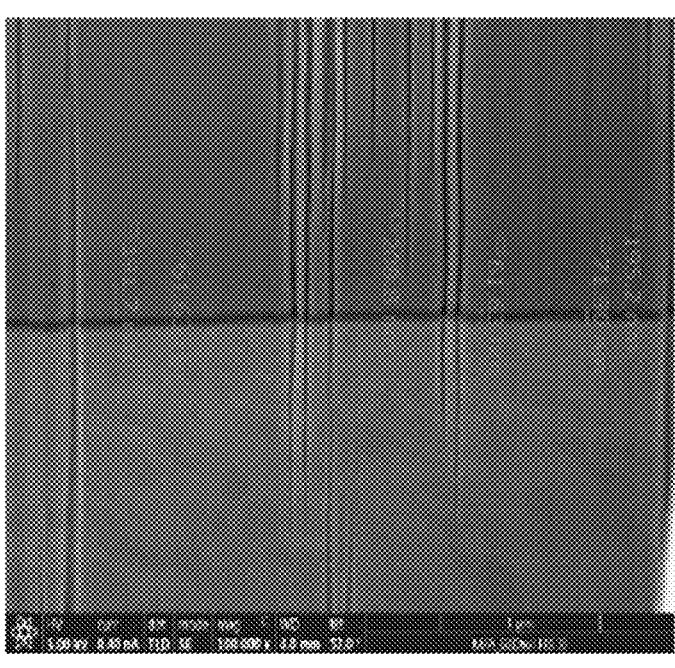
FIG. 5 shows an image of a result of FIB analysis on the central portion of the fourth surface S4 of the tantalum capacitor according to an embodiment.

FIGS. 4 and 5 are images showing the results of a focused ion beam (FIB) analysis on the central portion of the fourth surface S4 of the tantalum capacitor 100 according to an embodiment.

Referring to FIGS. 4 and 5, the average thickness of the first to fourth metal layers 141, 142, 143, and 144 may be measured in the following method. First, an optical microscope is used to find the tantalum wire 112 positioned in the central portion of the fourth surface S4 of the tantalum capacitor 100. In the central portion of the fourth surface S4 where the tantalum wire 112 is present, the focused ion beam (FIB) analysis is performed to measure each thickness of the third metal layer 143 and the fourth metal layer 144. Other methods and/or tools appreciated by one of ordinary skill in the art, even if not described in the present disclosure, may also be used.

Referring to FIG. 4, a darkest-displayed layer corresponds to the third metal layer 143, wherein since this third metal layer 143 has a clear boundary with a relatively lightly displayed layer, it is possible to measure its thickness.

In addition, referring to FIG. 4, since a fine interface layer is present between the fourth metal layer 144 and a sixth metal layer 172 described later, a thickness of the fourth metal layer 144 may be measured with reference to the interface layer.

In the same method, the central portion of the third surface of the tantalum capacitor 100, each thickness of the first metal layer 141 and the second metal layer 142 is measured by using the FIB (focused ion beam) analysis.

The average thickness of the first to fourth metal layers 141, 142, 143, and 144 may be obtained by averaging measurements at any 5 points or more in the FIB analysis result images.

The tantalum capacitor 100 of an embodiment may further include a base layer 150 between the capsule portion 120 and the external electrode 130.

For example, on the second surface of the capsule portion 120, the base layer 150 may be further disposed between the first and second external electrodes 131 and 132.

In order to form the capsule portion 120 and then, form the first and third metal layers 141 and 143, the tantalum body 111 first needs to be placed and fixed, wherein the base layer 150 serves to support the tantalum body 111.

In addition, on the bottom surface of the base layer 150, the first and second external electrodes 131 and 132 are disposed with a space apart each other in the L-axis direction.

The base layer 150 includes an insulating material to prevent electrical connection of the first and second external electrodes 131 and 132.

The insulating material may include a curable resin, an inorganic filler, or a combination thereof, but is not limited thereto, and any material having an insulating function may be used without limitation.

For example, the curable resin may be an epoxy resin such as a cresol novolak epoxy resin, a bisphenol A type epoxy resin, a bisphenol A type novolak epoxy resin, a phenol novolak epoxy resin, a multifunctional epoxy resin, a biphenyl type epoxy resin, a xylok type epoxy resin, a triphenol methane type epoxy resin, an alkyl modified triphenol methane epoxy resin, a naphthalene type epoxy resin, a dicyclopentadiene type epoxy resin, or a dicyclopentadiene modified phenol type epoxy resin, but is not limited thereto.

For example, the inorganic filler may include silica ($SiO_2$), alumina ($Al_2O_3$), silicon carbide (SiC), barium sulfate ($BaSO_4$), talc, clay, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), calcium zirconate ($CaZrO_3$), or a combination thereof, but is not limited to.

When the base layer 150 includes the inorganic filler, since strength of the base layer can be improved, it is possible to apply a thin base layer.

The tantalum capacitor 100 according to an embodiment further includes a conductive adhesive 160 between the tantalum body 111 and the base layer 150 and between the tantalum body 111 and the first metal layer 141.

The conductive adhesive 160 may include an epoxy-based resin or conductive metal powder, and may include Ag (silver) as an example, but is not limited thereto.

The tantalum capacitor 100 according to an embodiment may further include a connection electrode 165 on an upper surface of the base layer 150.

The connection electrode 165 may be made of a metal such as Cu.

One end of the connection electrode 165 may contact the first metal layer 141 through the third surface of the capacitor body 110 to be electrically connected to the first external electrode 131.

In addition, the conductive adhesive 160 may be formed to the bottom surface of the tantalum body 111, so that the conductive adhesive 160 may contact the upper surface of the connection electrode 165 to be electrically connected each other.

Accordingly, the connection electrode 165 may play a role of improving adherence and conductivity of the conductive adhesive 160.

Referring to FIGS. 2 and 3, the tantalum capacitor 100 according to an embodiment may further include a fifth metal layer 171 disposed one surface of the second metal layer 142; and a sixth metal layer 172 disposed one surface of the fourth metal layer 144. For example, the fifth metal layer 171 and the sixth metal layer 172 may be disposed on the surfaces of the capacitor body 110 facing in the first direction.

For example, the fifth metal layer 171 and the sixth metal layer 172 may be extended to the second surface of the capacitor body 110, which is the bottom surface of the first and second external electrodes 131 and 132. Herein, the fifth metal layer 171 and the sixth metal layer 172 may be disposed in a 'L' shape.

A method of forming the fifth metal layer 171 and the sixth metal layer 172 is not particularly limited but may include, for example, plating methods such as Subtractive, Additive, SAP (Semi-Additive Process), MSAP (Modified Semi-Additive Process), and the like.

Hereinafter, specific embodiments of the disclosure are presented. However, the examples described below are only for specifically illustrating or explaining the disclosure, and the scope of the disclosure is not limited thereto.

(Manufacturing Tantalum Capacitor Chips)

A tantalum capacitor chip is manufactured by using a frameless tantalum capacitor body and a sputtering process through which depositing first to fourth metal layers on both sides of the capacitor body in the L-axis direction. Herein, each composition and thickness of the first to fourth metal layers are as described in Tables 1 to 5.

Experimental Example 1: Leakage Current/Open Failure Analysis

The number of chips with a high leakage current (LC) after 504 hours under high temperature/high humidity conditions is counted, and the results are shown in Table 1. Herein, a chip with LC of 0.1 CV or higher and 35.4 μA or higher is counted as a chip with a high leakage current (LC), and 160 chips for each condition are used for the analysis.

For reference, the CV value is a multiplied product of capacitance [μF] of a corresponding chip and a rated voltage [V], which means a total amount of charges [μC] that a capacitor can store, when the voltage is applied to the capacitor. In general, the CV value is used to relatively compare leakage currents of capacitors having different voltages and capacitances.

For example, when a chip has a rated voltage of 16 V and capacitance of 22 μF, the corresponding capacitor holds a charge amount of 16 V×22 μF=352 μC, when 16 V is applied. Herein, when this charge amount is discharged in 1 second, a current of 352 μA is generated at this time. Accordingly, a capacitor with a large CV value is charged with a larger amount of charges, its leakage current also relatively increases in proportion to the CV value.

Accordingly, the leakage current (LC) of 0.1 CV or more, when a capacitor with a rated voltage of 16 V and capacitance of 22 μF is used as an example, means that 352 μC×0.1=35.2 μC is discharged for 1 second, that is, a leakage current of 35.2 μA.

In Examples 1-2, 1-3, 1-5, and 1-6 of Table 1, second and fourth metal layers are made of an alloy including 60 at % of Ni (nickel) and 40 at % of Cr (chromium).

TABLE 1

| Nos. | First metal layer and third metal layer (average thickness) | Second metal layer and fourth metal layer (average thickness) | Number of chips with high LC @504 hours |
|---|---|---|---|
| Comparative Example 1-1 | Cr (20 nm) | Cu (2000 nm) | 7/160 |
| Example 1-1 | | Ni (200 nm) | 0/160 |
| Example 1-2 | | Ni—Cr (200 nm) | 4/160 |
| Example 1-3 | | Ni—Cr (500 nm) | 2/160 |
| Example 1-4 | Ti (50 nm) | Ni (200 nm) | 2/160 |
| Example 1-5 | | Ni—Cr (200 nm) | 4/160 |
| Example 1-6 | | Ni—Cr (500 nm) | 3/160 |

Referring to Table 1, compared with Examples 1-1 to 1-6, Comparative Example 1-1 exhibit a large number of high LC.

(2) The number of open chips after 500 hours under high temperature and high humidity conditions is counted, and the results are shown in Table 2. Herein, 240 chips for each condition are analyzed, wherein all comparative examples and examples have second and fourth metal layer of Ni (200 nm).

TABLE 2

| Nos. | First metal layer and third metal layer (average thickness) | Second metal layer and fourth metal layer (average thickness) | Number of open chips @500 hours |
|---|---|---|---|
| Comparative Example 2-1 | Cr (8 nm) | Ni (200 nm) | 5/240 |
| Comparative Example 2-2 | Cr (10 nm) | | 2/240 |
| Example 2-1 | Cr (20 nm) | | 0/240 |
| Example 2-2 | Cr (100 nm) | | 0/240 |
| Comparative Example 2-3 | Ti (10 nm) | | 12/240 |
| Example 2-3 | Ti (20 nm) | | 0/240 |
| Example 2-4 | Ti (50 nm) | | 0/240 |
| Example 2-5 | Ti (100 nm) | | 0/240 |

Referring to Table 2, Examples 2-1 to 2-5 exhibit no open chip defects, but Comparative Examples 2-1 to 2-3 including first and third metal layers with an average thickness of less than 20 nm exhibit open chip defects.

(3) The number of open chips after 500 hours under high temperature and high humidity conditions is counted, and the results are shown in Table 3. Herein, 240 chips for each condition are analyzed.

TABLE 3

| Nos. | First metal layer and third metal layer (average thickness) | Second metal layer and fourth metal layer (average thickness) | Number of open chips @ 500 hours |
|---|---|---|---|
| Comparative Example 3-1 | Cr (20 nm) | Ni (40 nm) | 6/240 |
| Example 3-1 | | Ni (50 nm) | 0/240 |
| Example 3-2 | | Ni (100 nm) | 0/240 |
| Comparative Example 3-2 | Ti (50 nm) | Ni (40 nm) | 4/240 |
| Example 3-3 | | Ni (50 nm) | 0/240 |
| Example 3-4 | | Ni (100 nm) | 0/240 |

Referring to Table 3, Examples 3-1 to 3-4 exhibit no open chip defects, but Comparative Examples 3-1 and 3-2 including second and fourth metal layers with an average thickness of less than 50 nm exhibit open chip defects.

Experimental Example 2: Interface Adhesion Analysis

A tape test is performed by varying an average thickness of first and third metal layers and an average thickness of second and fourth metal layers.

In the tape test (KS A 1528), when a plating film is peeled off by attaching and removing a cellophane adhesive tape, NG is given.

Specifically, after attaching a tape with relatively strong adherence on a plate and bringing the third surface S3 of a chip into contact with the tape, the chip is adhered to the tape by applying a sufficient pressure thereto. Subsequently, after attaching another tape with a relatively weak adherence onto the fourth surface S4 of the chip by applying a pressure with a roller and the like, this tape is pulled up fast in a vertical direction to tear off the tape from the fourth surface S4. This process is repeated the predetermined number of times to check whether or not the metal layer is peeled off.

Figure 6:
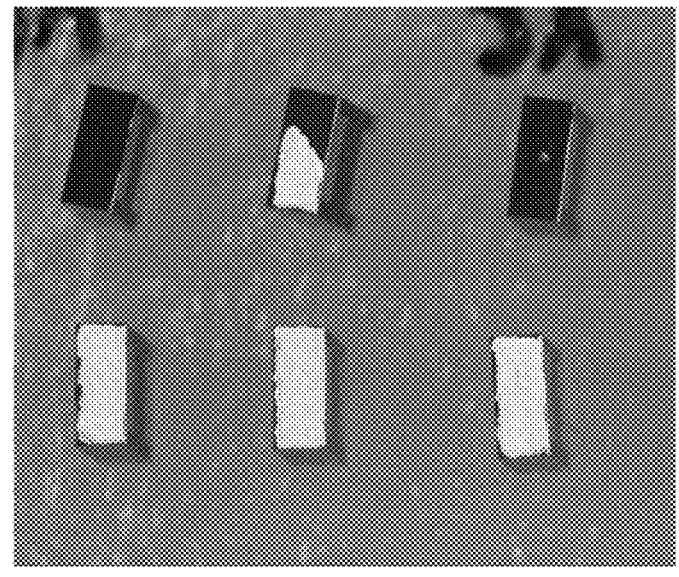
FIG. 6 is a photograph showing a sample in which a defect occurs as a result of performing a tape test on a tantalum capacitor chip according to an embodiment.
Figure 7:
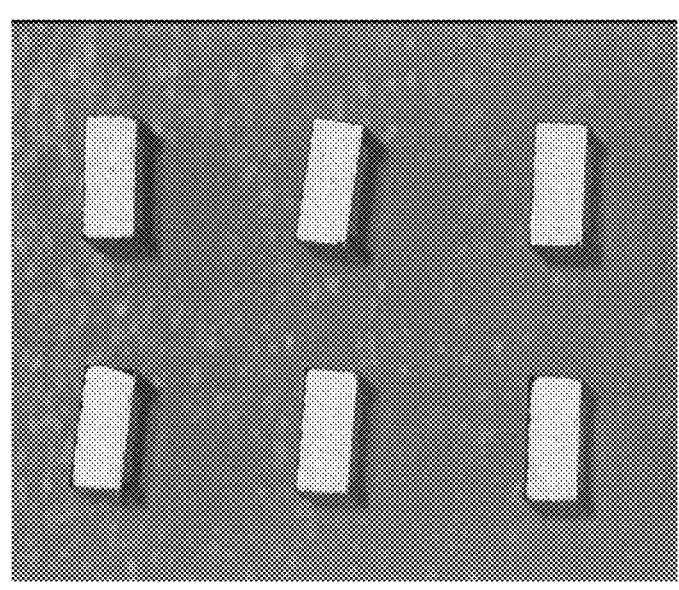
FIG. 7 is a photograph showing a sample in which a defect does not occur by performing a tape test on a tantalum capacitor chip according to an embodiment.

Each sample was tested 30 times to check interface adhesion of its metal layer and count the number of defects (NG Count), and the results are shown in Tables 4 and 5. When the defects occur, 'Failed' is given in the result, but when there are no defects, 'Pass' is given in the result. Referring to FIGS. 6 and 7, FIG. 6 shows a photograph of the sample in which the defects occur, but FIG. 7 shows a photograph of the sample in which no defects occur.

TABLE 4

| Nos. | First metal layer and third metal layer (average thickness) | Second metal layer and fourth metal layer (average thickness) | Number of defects (NG Count) | Results |
|---|---|---|---|---|
| Comparative Example 4-1 | Cr 10 nm | Ni (200 nm) | 2/30 | Failed |
| Comparative Example 4-2 | Cr 110 nm | | 1/30 | Failed |
| Comparative Example 4-3 | Ti 10 nm | | 3/30 | Failed |
| Comparative Example 4-4 | Ti 110 nm | | 1/30 | Failed |
| Example 4-1 | Cr 20 nm | | 0/30 | Pass |
| Example 4-2 | Ti 20 nm | | 0/30 | Pass |
| Example 4-3 | Cr 100 nm | | 0/30 | Pass |
| Example 4-4 | Ti 100 nm | | 0/30 | Pass |

Referring to Table 4, Comparative Examples 4-1 to 4-4 including first and third metal layers with an average thickness of less than 20 nm or greater than 100 nm exhibit defects, which confirm deteriorated interface adhesion. On the contrary, Examples 4-1 to 4-4 exhibit no defects at all.

TABLE 5

| Nos. | First metal layer and third metal layer (average thickness) | Second metal layer and fourth metal layer (average thickness) | Number of defects (NG Count) | Results |
|---|---|---|---|---|
| Example 5-1 | Cr (20 nm) | Ni (100 nm) | 0/30 | Pass |
| Example 5-2 | | Ni (200 nm) | 0/30 | Pass |
| Example 5-3 | | Ni (500 nm) | 0/30 | Pass |
| Comparative Example 5-1 | | Ni (600 nm) | 2/30 | Failed |
| Example 5-4 | Ti (50 nm) | Ni (100 nm) | 0/30 | Pass |
| Example 5-5 | | Ni (200 nm) | 0/30 | Pass |
| Example 5-6 | | Ni (500 nm) | 0/30 | Pass |
| Comparative Example 5-2 | | Ni (600 nm) | 1/30 | Failed |

Referring to Table 5, Comparative Examples 5-1 and 5-2 including second and fourth metal layers with an average thickness of greater than 500 nm exhibit defects, which confirm deteriorated interface adhesion. On the contrary, Examples 5-1 to 5-6 exhibit no defects at all.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A tantalum capacitor, comprising
a capacitor body including (i) a tantalum body including a tantalum wire extending toward a surface of the capacitor body; and (ii) a capsule portion surrounding the tantalum body such that the capsule portion does not cover an end of the tantalum wire;
a solid electrolyte layer disposed on a surface of the tantalum body and including para-toluenesulfonic acid (P-TSA);
a first metal layer on one side of the capacitor body;
a second metal layer on one side of the first metal layer; and
an external electrode connected to the first metal layer,
wherein the first metal layer includes Cr (chromium), Ti (titanium), an alloy thereof, or a mixture thereof,
the second metal layer includes Ni (nickel), an alloy including the same, or a mixture including the same,
an average thickness of the first metal layer is smaller than an average thickness of the second metal layer,
an average thickness of the first metal layer is 20 nm to 100 nm, and
an average thickness of the second metal layer is 50 nm to 500 nm.

2. The tantalum capacitor of claim 1, further comprising (i) a third metal layer on the surface of the capacitor body and facing the first metal layer in a first direction; and (ii) a fourth metal layer on one surface of the third metal layer,
wherein the capacitor body includes first and second surfaces facing each other in a second direction perpendicular to the first direction, third and fourth surfaces facing each other in the first direction, and fifth and sixth surfaces facing each other in a third direction perpendicular to the first and second directions,
the third metal layer includes Cr (chromium), Ti (titanium), an alloy thereof, or a mixture thereof, and
the fourth metal layer includes Ni (nickel), an alloy including the same, or a mixture including the same.

3. The tantalum capacitor of claim 2, wherein the external electrode includes first and second external electrodes spaced apart from each other and disposed on the second surface of the capacitor body.

4. The tantalum capacitor of claim 3, wherein the first external electrode is connected to the tantalum body, and
the second external electrode is connected to the tantalum wire.

5. The tantalum capacitor of claim 2, wherein an average thickness of the third metal layer is 20 nm to 100 nm, and
an average thickness of the fourth metal layer is 50 nm to 500 nm.

6. The tantalum capacitor of claim 1, further comprising a base layer between the capsule portion and the external electrode.

7. The tantalum capacitor of claim 6, further comprising a connection electrode between the base layer and the tantalum body.

8. A tantalum capacitor, comprising
a capacitor body including (i) a tantalum body including a tantalum wire extending toward a surface of the capacitor body and (ii) a capsule portion surrounding the tantalum body such that the capsule portion does not cover an end of the tantalum wire;
a solid electrolyte layer disposed on a surface of the tantalum body and including para-toluenesulfonic acid (P-TSA);

a first metal layer on a first side of the capacitor body;

a second metal layer on one side of the first metal layer;

a third metal layer on a second side of the capacitor body;

a fourth metal layer on one side of the third metal layer; and an external electrode connected to the first metal layer and the third metal layer, wherein the first and third metal layers include Cr (chromium), Ti (titanium), an alloy thereof, or a mixture thereof, the second and fourth metal layers include Ni (nickel), an alloy including the same, or a mixture including the same, an average thickness of each of the first and third metal layers is smaller than an average thickness of each of the second and fourth metal layers, an average thickness of each of the first metal layer and the third metal layer is 20 nm to 100 nm, and an average thickness of each of the second metal layer and the fourth metal layer is 50 nm to 500 nm.

9. The tantalum capacitor of claim 8, wherein the capacitor body includes first and second surfaces facing each other in a second direction, third and fourth surfaces facing each other in a first direction perpendicular to the second direction, and fifth and sixth surfaces facing each other in a third direction perpendicular to the first and second directions, and the external electrode includes first and second external electrodes spaced apart from each other and disposed on the second surface of the capacitor body.

10. The tantalum capacitor of claim 9, wherein the first external electrode is connected to the tantalum body, and the second external electrode is connected to the tantalum wire.

11. The tantalum capacitor of claim 8, further comprising a base layer between the capsule portion and the external electrode.

12. The tantalum capacitor of claim 11, further comprising a connection electrode between the base layer and the tantalum body.

13. The tantalum capacitor of claim 8, wherein the tantalum capacitor is a frameless tantalum capacitor.

14. The tantalum capacitor of claim 8, wherein the first and third metal layers include Cr (chromium) or Ti (titanium).

15. The tantalum capacitor of claim 14, wherein the second and fourth metal layers include Ni (nickel) or an alloy including Ni (nickel) and Cr (chromium).

* * * * *